(12) United States Patent
Razeghi et al.

(10) Patent No.: US 12,270,382 B2
(45) Date of Patent: Apr. 8, 2025

(54) MAIN LAMINATE FOR A WIND TURBINE BLADE AND ASSOCIATED METHOD

(71) Applicant: LM WIND POWER A/S, Kolding (DK)

(72) Inventors: Rama Razeghi, Hampshire (GB); Jeppe Bjørn Jørgensen, Kolding (DK); Paul Todd, Hampshire (GB); Boas Eirikksson, Kolding (DK)

(73) Assignee: LM WIND POWER A/S, Kolding (DK)

( * ) Notice: Subject to any disclaimer, the term of this patent is extended or adjusted under 35 U.S.C. 154(b) by 0 days.

(21) Appl. No.: 18/285,685

(22) PCT Filed: May 3, 2022

(86) PCT No.: PCT/EP2022/061755
§ 371 (c)(1),
(2) Date: Oct. 5, 2023

(87) PCT Pub. No.: WO2022/233811
PCT Pub. Date: Nov. 10, 2022

(65) Prior Publication Data
US 2024/0117792 A1   Apr. 11, 2024

(30) Foreign Application Priority Data
May 4, 2021 (EP) .................................... 21172001

(51) Int. Cl.
*F03D 80/30* (2016.01)
*F03D 1/06* (2006.01)

(52) U.S. Cl.
CPC ......... *F03D 80/301* (2023.08); *F03D 1/0675* (2013.01); *F05B 2230/50* (2013.01); *F05B 2280/6013* (2013.01)

(58) Field of Classification Search
CPC ...... F03D 1/0675; F03D 80/30; F03D 80/301; F05B 2240/85
See application file for complete search history.

(56) References Cited

U.S. PATENT DOCUMENTS

| 7,651,320 | B2 * | 1/2010 | Hansen | H02G 13/00 416/1 |
| 11,713,749 | B2 * | 8/2023 | March Nomen | F03D 80/30 416/230 |
| 2007/0074892 | A1 * | 4/2007 | Hibbard | F03D 80/00 174/117 FF |

(Continued)

FOREIGN PATENT DOCUMENTS

| EP | 4283116 A1 * | 11/2023 | ........... F03D 1/0675 |
| WO | WO-2024068470 A1 * | 4/2024 | ........... F03D 1/0675 |

*Primary Examiner* — Sang K Kim
(74) *Attorney, Agent, or Firm* — Nath, Goldberg & Meyer; Jerald L. Meyer; Tanya E. Harkins

(57) ABSTRACT

A main laminate for a wind turbine blade, a wind turbine blade, and methods for manufacturing such components are disclosed. The main laminate extends along a longitudinal direction and comprising a connector element comprising a conductive mesh portion and an elongated connector part, wherein a connector part length is longer than an edge distance between the conductive mesh portion and a first edge, and wherein a secondary connector portion of the elongated connector part is bendable around a bend axis substantially parallel to the longitudinal direction.

19 Claims, 11 Drawing Sheets

(56) References Cited

U.S. PATENT DOCUMENTS

| | | |
|---|---|---|
| 2020/0340446 A1 | 10/2020 | Girolamo |
| 2023/0041394 A1* | 2/2023 | Eiriksson ................ F03D 80/30 |
| 2024/0035448 A1* | 2/2024 | Madsen ................ H02G 13/80 |

* cited by examiner

_US 12,270,382 B2_

MAIN LAMINATE FOR A WIND TURBINE BLADE AND ASSOCIATED METHOD

This is a National Phase Application filed under 35 U.S.C. 371 as a national stage of PCT/EP2022/061755, filed May 3, 2022, an application claiming the benefit of European Application Ser. No. 21/172,001.6, filed May 4, 2021, the content of each of which is hereby incorporated by reference in its entirety.

The present disclosure relates to main laminates for wind turbine blades, and more specifically for lightning protection of a main laminate for a wind turbine blade. Particularly, for a main laminate comprising conductive fibres, such as carbon fibres, such as in pultruded carbon elements. The main laminate denotes the load-carrying structure of a wind turbine blade and may be integrated in the shell of the blade. The main laminate may alternatively be referred to as a spar cap.

BACKGROUND

As wind turbines and wind turbine blades increase in size, the risk of lighting striking the wind turbine increases. It is therefore of increasing interest to provide wind turbines and in particular wind turbine blades with lightning protection measures.

It is known to provide blades for wind turbines with lightning receptors that are, inside the blade, in electric connection with a down conductor that is able to connect a lightning current to earth.

A wind turbine blade is typically assembled by a number of components. For example, a typical wind turbine blade is manufactured by moulding individual shell halves, shear webs etc.

Wind turbine blades of fibre-reinforced polymer and in particular the aerodynamic shells of wind turbine blades are usually manufactured in moulds, where the pressure side and the suction side of the blade are manufactured separately by arranging glass fibre mats and/or other fibre-reinforcement material, such as carbon fibre, in each of the two mould parts. Afterwards, the two halves are positioned on top of each other, and the two halves are glued together. The blade parts may be positioned on top of each other by turning and repositioning the complete half mould.

As the demand for blades for wind turbines tends towards blades of increasing lengths, a need concurrently arises for manufacture of blades having increased rigidity and a comparatively lower weight. One way of achieving these properties is to combine various types of fibres in the laminate of the blades, for instance it is an option to combine glass fibres and carbon fibres, and likewise carbon fibres or glass fibres may advantageously be combined with steel fibres. Combinations with other types of fibres are thus also possible and it is also an option to exclusively employ carbon fibres or other suitable fibre type. Utilization some fibres types may possess a problem in that some of the fibre types are electrically conductive, e.g. carbon fibres and steel fibres. A lightning strike directly into the laminate may cause damage to a blade comprising electrically conductive fibres, as they would conduct the current and thereby i.a. be greatly heated. Furthermore, resin bonding fibres together might be a poor conductor, providing for risk of flashover between conductive fibres being held in the resin, which may potentially damage the material.

Thus, it is of increasing importance to provide a lightning protection system and ways of integrating a lightning protection system, which protects components of the wind turbine blade, comprising electrically conductive materials, from being damaged by lightning strikes.

SUMMARY

It is an object of the present disclosure to provide a wind turbine blade comprising a main laminate, and a method for manufacturing such main laminate and wind turbine blade which overcomes at least some of the disadvantages of the prior art.

Accordingly, a main laminate for a wind turbine blade is disclosed, wherein the main laminate extends along a longitudinal direction and comprises a plurality of fibre elements, wherein each of the plurality of fibre elements comprises conductive fibres, e.g. carbon fibres or steel fibres, arranged substantially along the longitudinal direction. The plurality of fibre elements may be individual fibres, such as rowings or tows, or pre-manufactured fibre elements, such as pultruded fibre elements, e.g. extending along the longitudinal direction. Alternatively or additionally, the plurality of fibre elements may be pre-pregs.

The plurality of fibre elements collectively extends from a first end to a second end along the longitudinal direction and between a first edge and a second edge along a transversal direction perpendicular to the longitudinal direction. A thickness direction is perpendicular to the transversal direction and the longitudinal direction. The plurality of fibre elements collectively forms a top surface between the first edge and the second edge and/or between the first end and the second end. The plurality of fibre elements may collectively extend between a bottom surface and the top surface along the thickness direction.

The main laminate comprises a connector element comprising a conductive mesh portion and a elongated connector part. The conductive mesh portion may be copper and/or Expanded Metal Foil (EMF). The elongated connector part extends between a primary connector part end and a secondary connector part end. The primary connector part end is coupled with the conductive mesh portion. The elongated connector part extends at a connector part length from the conductive mesh portion to the secondary connector part end. The elongated connector part has a primary connector portion towards the primary connector part end and a secondary connector portion between the primary connector portion and the secondary connector part end. The conductive mesh portion is arranged at a portion of the top surface of the plurality of fibre elements at an edge distance from the first edge, and the elongated connector part extends from the primary connector part end in the transversal direction towards the first edge. The connector part length is longer than the edge distance. The secondary connector portion of the elongated connector part may be bendable around a bend axis substantially parallel to the longitudinal direction.

The disclosed main laminate has the advantage that handling of the main laminate is made easier in that protruding elements are limited, which could be broken during lifting of the main laminate, and might posses a safety issue during handling.

Furthermore, the disclosure provides for ways of decreasing the risk of damaging lightning protection elements, which could cause areas of the wind turbine to be at increased risk of being damaged by lightning.

Also disclosed is a wind turbine blade comprising a main laminate, such as the main laminate as described above. The wind turbine blade extends in a longitudinal direction from a root to a tip. The longitudinal direction of the wind turbine blade and the longitudinal direction of the main laminate may be the same direction and/or they may be parallel when the main laminate is arranged in the wind turbine blade. The wind turbine blade comprises a pressure side and a suction side.

Also discloses is a method for manufacturing a main laminate for a wind turbine blade, such as the main laminate as described above.

The method comprises providing a plurality of fibre elements, wherein each of the plurality of fibre elements comprises conductive fibres, e.g. carbon fibres or steel fibres. The method further comprises arranging the plurality of fibre elements as described above, e.g. such that the conductive fibres are arranged substantially along a longitudinal direction, and such that the plurality of fibre elements collectively extend from the first end to the second end along the longitudinal direction and between the first edge and the second edge along the transversal direction perpendicular to the longitudinal direction, and such that the plurality of fibre elements collectively forms the top surface between the first edge and the second edge and/or between the first end and the second end.

The method comprises providing a connector element, such as the connector element as described above, e.g. comprising a conductive mesh portion and an elongated connector part. The elongated connector part extends between a primary connector part end and a secondary connector part end. The primary connector part end is coupled with the conductive mesh portion. The elongated connector part extends at a connector part length from the conductive mesh portion to the secondary connector part end. The elongated connector part having a primary connector portion towards the primary connector part end and a secondary connector portion between the primary connector portion and the secondary connector part end.

The method comprises arranging the connector element such that the conductive mesh portion is at the portion of the top surface at an edge distance from the first edge, and such that the elongated connector part is extending from the primary connector part end in the transversal direction towards the first edge, and such that the connector part length is longer than the edge distance.

The method comprises infusing the plurality of fibre elements, the conductive mesh portion and the primary connector portion of the elongated connector part with a first resin, without infusing the secondary connector portion with the first resin.

Also disclosed is a method for manufacturing a wind turbine blade, such as the wind turbine blade as described above. The method comprises providing a blade shell extending in a longitudinal direction from a root to a tip. The blade shell has an outside surface for forming an outer surface of the wind turbine blade and an inner side opposite the outside surface.

The method comprises providing a main laminate, such as the main laminate as described above. The main laminate may be provided by the method for manufacturing a main laminate as described above. The secondary connector portion of the elongated connector part of the main laminate provided may be bend around a bend axis substantially parallel to the longitudinal direction, e.g. such that the elongated connector part forms a bend of more than 45 degrees, such as more than 90 degrees, and/or such that the elongated connector part does not cross the first edge of the main laminate.

The method comprises positioning the main laminate on the inner side of the blade shell, such that the longitudinal direction of the blade shell is substantially parallel with the longitudinal direction of the main laminate, and such that the top surface of the plurality of fibre elements faces away from the inner side of the blade shell.

The method comprises straightening the elongated connector to reduce the bend, such that the elongated connector part extends across the first edge of the plurality of fibre elements of the main laminate and the secondary connector portion connects to an inside surface part of the inner side of the blade shell.

BRIEF DESCRIPTION OF THE FIGURES

Embodiments of the disclosure will be described in more detail in the following with regard to the accompanying figures. The figures show one way of implementing the present disclosure and are not to be construed as being limiting to other possible embodiments falling within the scope of the attached claim set.

DETAILED DESCRIPTION

Figure 1:
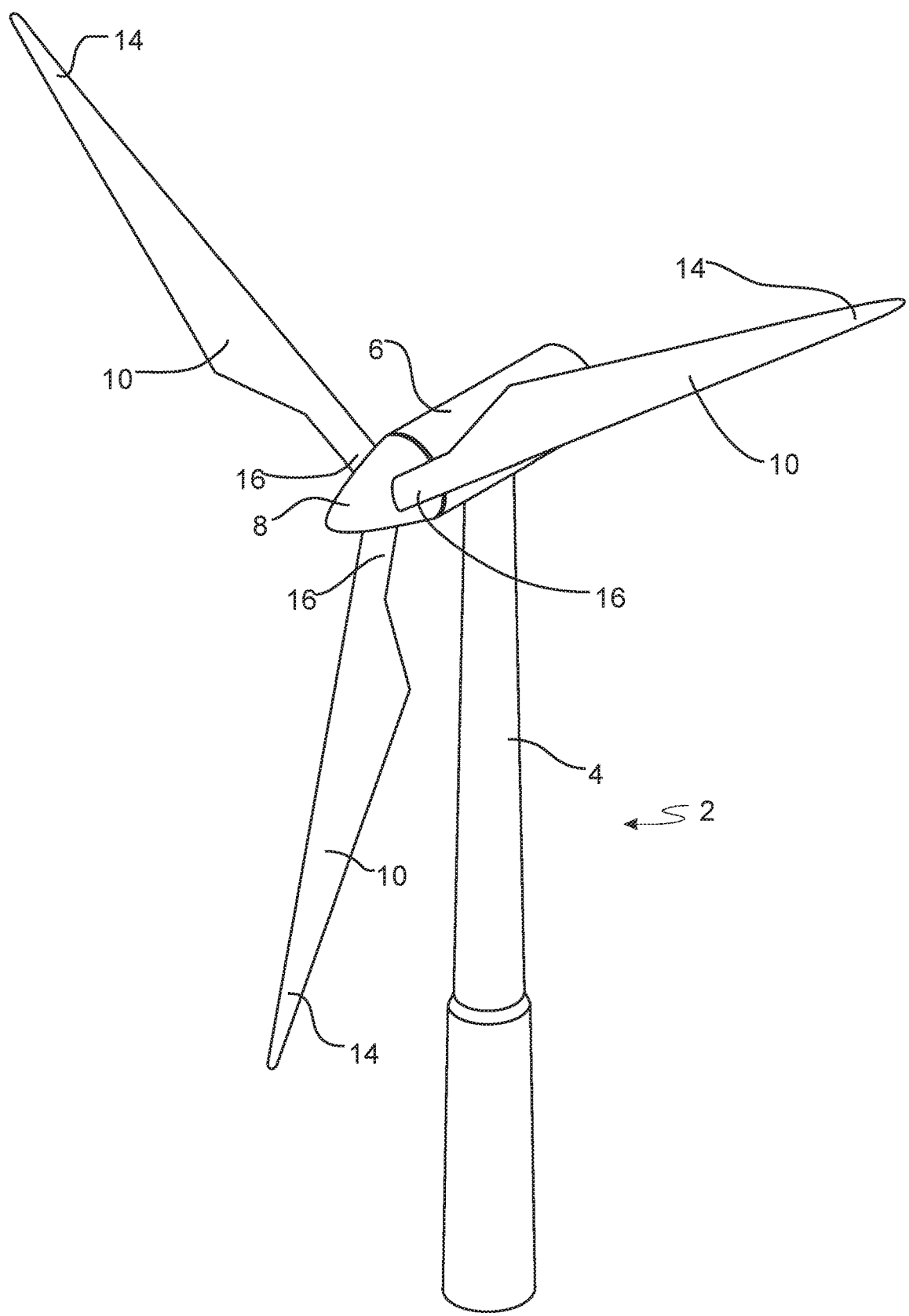
FIG. 1 illustrates an exemplary wind turbine.

Further details of the aspects of the disclosure, as set out above, are provided in the following. Details and/or advantages may be practiced in any embodiment and/or aspect even if not so illustrated, or if not so explicitly described.

The method for manufacturing the main laminate may comprise, e.g. prior to infusing with the first resin, enclosing the plurality of fibre elements, the conductive mesh portion and the primary connector portion of the elongated connector part in a resin infusion enclosure, optionally such that the secondary connector portion of the elongated connector part is protruding outside the resin infusion enclosure. Alternatively or additionally, the method may comprise enclosing the secondary connector portion of the elongated connector part in a protective enclosure. Thereby, resin infusion of the secondary connector portion may be prevented, to maintain flexibility of the secondary connector portion.

As mentioned above, the secondary connector portion may be bend around a bend axis, e.g. prior to being positioned on the inner side of the blade shell. Bending of the secondary connector portion may be provided at various points during the method for manufacturing the wind turbine blad or the main laminate. The method for manufacturing the main laminate may comprise bending the elongated connector part around the bend axis substantially parallel to the longitudinal direction. For example, the method for manufacturing the main laminate may comprise bending the elongated connector part prior to infusing with the first resin and/or prior to enclosing elements in the resin infusion enclosure and/or prior to enclosing the secondary connector portion in the protective enclosure.

The wind turbine blade may comprise a down conductor extending in the longitudinal direction and being configured to provide an electrical coupling to the ground. The connector element of the main laminate may be electrically connected to the down conductor. The method for manufacturing the wind turbine blade may comprise electrically connecting the connector element to the down conductor of the wind turbine blade. The wind turbine blade may comprise a lightning receptor. The lightning receptor may be coupled with the secondary connector part end of the elongated connector part, e.g. with a plate element arranged at the secondary connector part end. Such plate element is described in more detail below. The method for manufacturing the wind turbine blade may comprise electrically connecting the connector element to the lightning receptor of the wind turbine blade. The lightning receptor may be provided on the outside surface of the blade shell. The lightning receptor may be coupled with the secondary connector part end of the elongated connector part, through the blade shell, e.g. by an electrically conductive screw or bolt. The method for manufacturing the wind turbine blade may comprise coupling the lightning receptor with the secondary connector part end of the elongated connector, through the blade shell, e.g. by an electrically conductive screw or bolt.

After connecting the connector element to the down conductor and/or the lightning receptor, the secondary connector portion may be fixated by that coupling, thereby the secondary connector portion may no longer be practically bendable. Hence, the secondary connector portion of the elongated connector part may be bendable, e.g. prior to being installed in the wind turbine blade.

After straightening the elongated connector to reduce the bend, the method for manufacturing the wind turbine blade may comprise infusing the blade shell and the main laminate with a second resin. The second resin and the first resin may be the same type of resin, e.g. polyester, epoxy or vinylester. Alternatively, the second resin and the first resin may be different types of resin. For example, the first resin may be polyester and the second resin may be vinylester.

The elongated connector part may extend across the first edge. The secondary connector part end may be attached to an inside surface part of the wind turbine blade, e.g. lateral to the top surface of the plurality of fibre elements of the main laminate.

The elongated connector part may be a braid cable.

The conductive mesh portion may be welded to the primary connector part end of the elongated connector part.

The conductive mesh portion may have a mesh thickness in the thickness direction. The elongated connector part may have a connector part thickness in the thickness direction. The connector part thickness may be larger than the mesh thickness.

The conductive mesh portion may have a mesh width in the longitudinal direction and the elongated connector part has a connector part width in the longitudinal direction. The connector part width may be smaller than the mesh width.

The connector element may comprise a plate element. The plate element may be a disc. The plate element may be arranged at the secondary connector part end. The plate element may be adapted to be coupled with the lightning receptor of the wind turbine blade and/or to be connected to the down conductor of the wind turbine blade. The plate element may be welded to the secondary connector part end.

The connector element may comprise a plug or a socket element. The plug or socket element may be arranged at the secondary connector part end. The plug or socket element may be adapted to engage with a corresponding plug or socket element connected with a lightning receptor of the wind turbine blade and/or connected with a down conductor of the wind turbine blade. In some examples, the connector element may comprise a plug element and the lightning receptor and/or down conductor may be connected with a corresponding socket element. In other examples, the connector element may comprise a socket element and the lightning receptor and/or down conductor may be connected with a corresponding plug element.

The main laminate may comprise a primary intermediate fibre layer. The primary intermediate fibre layer may comprise conductive fibres, e.g. carbon fibres and/or steel fibres. The primary intermediate fibre layer may be arranged between the conductive mesh portion and the top surface of the plurality of fibre elements. The main laminate may comprise a secondary intermediate fibre layer. The secondary intermediate fibre layer may comprise conductive fibres, e.g. carbon fibres and/or steel fibres. The secondary intermediate fibre layer may be arranged between the primary intermediate fibre layer and the top surface of the plurality of fibre elements. The conductive fibres of the primary intermediate fibre layer may be arranged along one or more primary intermediate fibre directions. For example, the primary intermediate fibre layer may be a biaxial fibre layer. The conductive fibres of the secondary intermediate fibre layer may be arranged along one or more secondary intermediate fibre directions. For example, the secondary intermediate fibre layer may be a biaxial fibre layer. One or more of the one or more secondary intermediate fibre directions may be different than the one or more primary intermediate fibre directions.

The main laminate may comprise a primary top fibre layer. The primary top fibre layer may comprise conductive fibres, e.g. carbon fibres and/or steel fibres. The conductive mesh portion may be arranged between the primary top fibre layer and the top surface of the plurality of fibre elements. The main laminate may comprise a secondary top fibre layer. The secondary top fibre layer may comprise conductive fibres, e.g. carbon fibres and/or steel fibres. The secondary top fibre layer may be arranged between the primary top fibre layer and the conductive mesh portion. The fibres, such as the conductive fibres, of the primary top fibre layer may be arranged along one or more primary top fibre directions. For example, the primary top fibre layer may be a biaxial fibre layer. The fibres, such as the conductive fibres, of the secondary top fibre layer may be arranged along one or more secondary top fibre directions. For example, the secondary top fibre layer may be a biaxial fibre layer. One or more of the one or more secondary top fibre directions may be different than the one or more primary top fibre directions.

One or more or all of the one or more secondary top fibre directions may be the same as the one or more primary intermediate fibre directions. One or more or all of the one or more primary top fibre directions may be the same as the one or more secondary intermediate fibre directions.

Tertiary fibre layers may be provided and arranged to cover the secondary connector portion. A tertiary intermediate fibre layer may be arranged such that the tertiary intermediate fibre layer is between the secondary connector portion and the inside surface part of the inner side of the blade shell. The tertiary intermediate fibre layer may comprise conductive fibres, e.g. carbon fibres and/or steel fibres. The method for manufacturing the wind turbine blade may comprise providing the tertiary intermediate fibre layer and arranging the tertiary intermediate fibre layer, e.g. on the inside surface part of the inner side of the blade shell, such that the tertiary intermediate fibre layer is between the secondary connector portion and the inside surface part of the inner side of the blade shell. A tertiary top fibre layer may be arranged such that the secondary connector portion is between the tertiary top fibre layer and the inside surface part of the inner side of the blade shell. The tertiary top fibre layer may comprise conductive fibres, e.g. carbon fibres and/or steel fibres. The method for manufacturing the wind turbine blade may comprise providing the tertiary top fibre layer, and arranging the tertiary top fibre layer such that the secondary connector portion is between the tertiary top fibre layer and the inside surface part of the inner side of the blade shell.

The fibres, such as the conductive fibres, of the tertiary intermediate fibre layer may be arranged along one or more tertiary intermediate fibre directions. For example, the tertiary intermediate fibre layer may be a biaxial fibre layer. The fibres, such as the conductive fibres, of the tertiary top fibre layer may be arranged along one or more tertiary top fibre directions. For example, the tertiary top fibre layer may be a biaxial fibre layer.

Each of the fibre layers, such as the primary intermediate fibre layer, the secondary intermediate fibre layer, the tertiary intermediate fibre layer, the primary top fibre layer, the secondary top fibre layer, and/or the tertiary top fibre layer, may be a cloth, a veil, or a mat of fibre material.

The main laminate may comprise a plurality of connector elements similar to the connector element as described above. The plurality of connector element may be electrically coupled to a down conductor of the wind turbine blade. The wind turbine blade may comprise a plurality of lightning receptors, each lightning receptor may be electrically coupled to a respective connector element.

The wind turbine blade may comprise a plurality of main laminates, e.g. two main laminates, e.g. a suction side main laminate and a pressure side main laminate. Each of the plurality of main laminates may be like the main laminate as described herein.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 illustrates an exemplary wind turbine 2, such as a conventional modern upwind wind turbine according to the so-called "Danish concept". The wind turbine 2 has a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
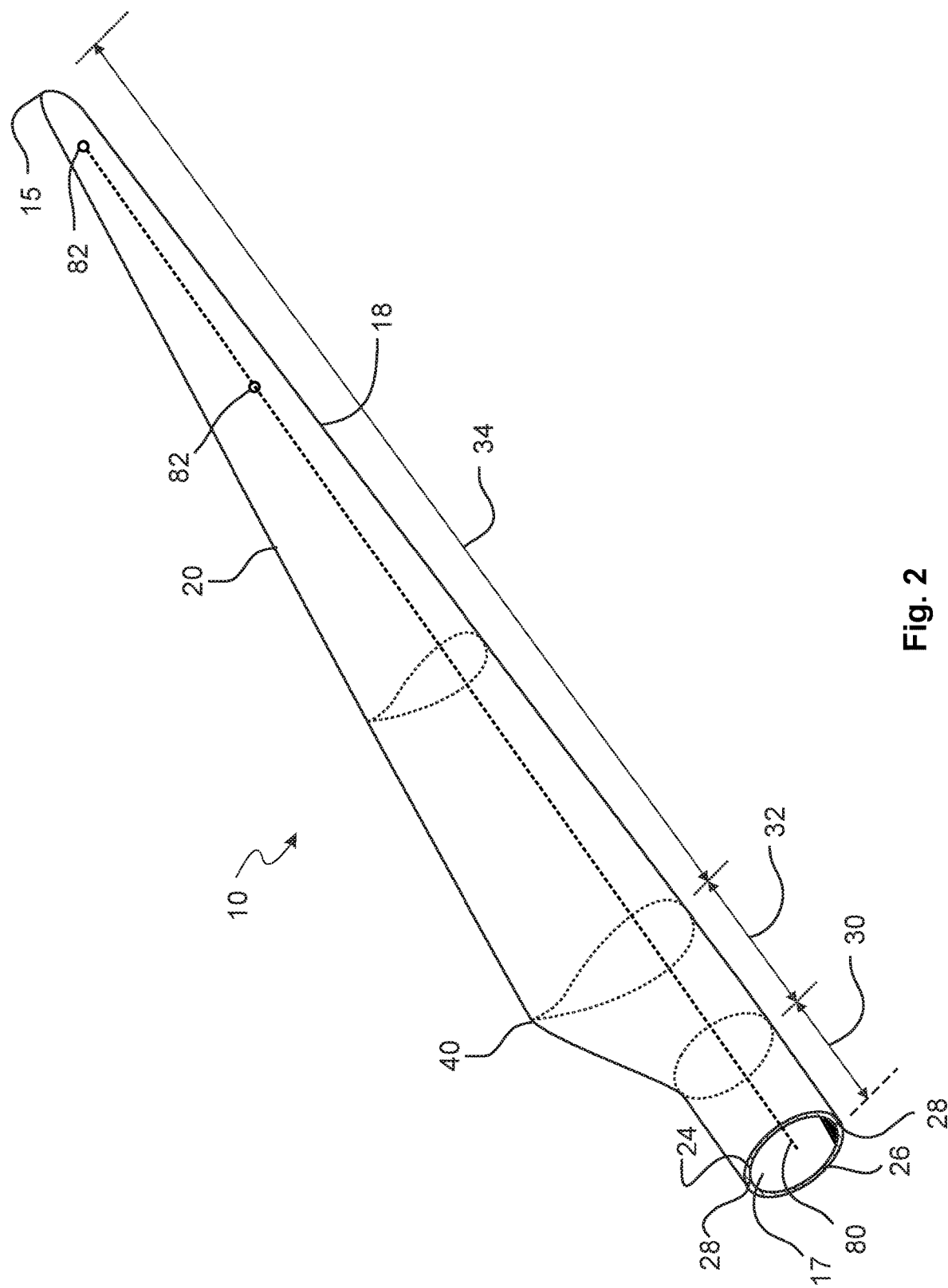
FIG. 2 shows a schematic view of an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell comprising two blade shell parts or half shells, a first blade shell part 24 and a second blade shell part 26, typically made of fibre-reinforced polymer. The wind turbine blade 10 may comprise additional shell parts, such as a third shell part and/or a fourth shell part. The first blade shell part 24 is typically a pressure side or upwind blade shell part. The second blade shell part 26 is typically a suction side or downwind blade shell part. The first blade shell part 24 and the second blade shell part 26 are fastened together with adhesive, such as glue, along bond lines or glue joints 28, e.g. extending along the trailing edge 20 and the leading edge 18 of the blade 10. Typically, the root ends of the blade shell parts 24, 26 has a semi-circular or semi-oval outer cross-sectional shape.

The wind turbine blade 10 comprises a down conductor 80 and a lightning receptor 82. The down conductor 80 extends along the length of the blade 10 and is configured to provide an electrical coupling to the ground.

Figure 3:
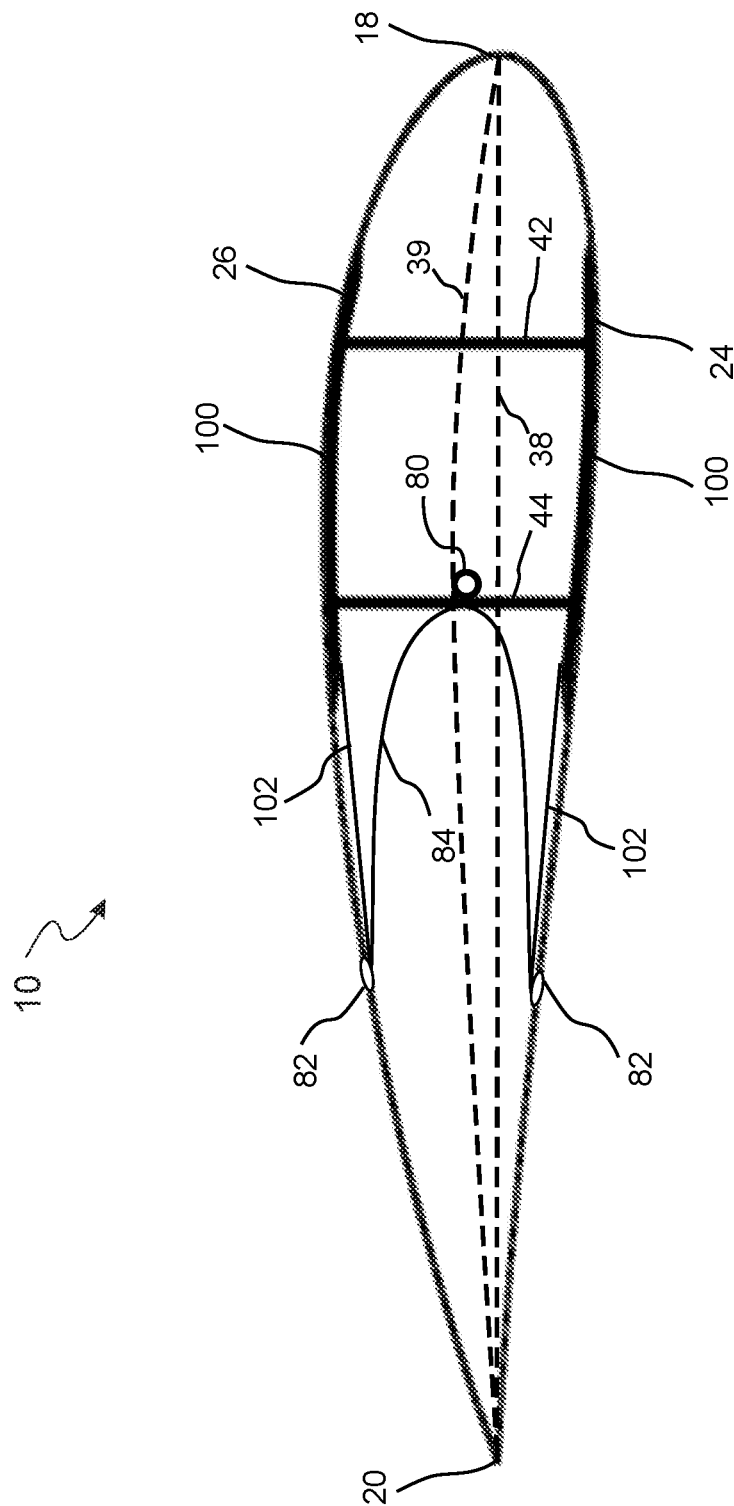
FIG. 3 is a schematic diagram illustrating a cross sectional view of an exemplary wind turbine blade, FIGS. 4 and 5 schematically illustrates an exemplary main laminate, FIG. 6 schematically illustrates an exemplary connector element, FIG. 7 schematically illustrates another exemplary connector element, FIG. 8 schematically illustrates an exploded view of an exemplary arrangement, FIGS. 9A and 9B schematically illustrates part of a wind turbine blade.

FIG. 3 is a schematic diagram illustrating a cross sectional view of an exemplary wind turbine blade 10, e.g. a cross sectional view of the airfoil region of the wind turbine blade 10. The wind turbine blade 10 comprises a leading edge 18, a trailing edge 20, a pressure side 24, and a suction side 26. The wind turbine blade 10 further comprises two main laminates 100, one being arranged towards the pressure side 24 and the other being arranged towards the suction side 26. The wind turbine blade 10 comprises a chord line 38 between the leading edge 18 and the trailing edge 20. Also, a blade median may be defined (also sometimes referred to as the camber line) between the pressure side 24 and the suction side 26 is illustrated. The blade median 39 is the median between the pressure side 24 and the suction side 26, measured perpendicular to the chord line 38. The blade median may be found by drawing inscribed circles from the leading edge 18 to the trailing edge 20. The blade median follows the centres of these inscribed circles.

The wind turbine blade 10 comprises shear webs, such as a leading edge shear web 42 and a trailing edge shear web 44. The shear webs 42, 44 extends between the pressure side 24 and the suction side 26 of the wind turbine blade 10, e.g. between the main laminates 100. The main laminates 100 may comprise carbon fibres. The shell parts 24, 26 may comprise glass fibres. The main laminates 100 may comprise pultruded elements, such as pultruded carbon fibre elements.

The down conductor 80 is arranged on the trailing edge shear web 44, more specifically on the leading edge side of the trailing edge shear web 44. In another example, the down conductor 80 may be arranged on the trailing edge side of the trailing edge shear web 44. In another exemplary wind turbine blade, the down conductor may be arranged on a centre web (not shown). The down conductor 80 is extending along the shear web 44. Lightning receptors 82 are arranged at or in proximity of an external surface of the wind turbine blade, e.g. one at the suction side 26 and one at the pressure side. The lightning receptors 82 are electrically connected to the down conductor 80, e.g. via the common connector 84, as illustrated.

The wind turbine blade 10 also comprises connector elements 102 for electrically connecting the main laminate to the down conductor 80 and thereby to the ground. The connector elements 102 may be electrically connected to the down conductor 80 by the common connector 84, as illustrated. For example, a connector element 102 may be coupled to a lightning receptor 82, and the connector element 102 and lightning receptor 82 may be commonly connected to the down conductor 80 by the common connector 84.

Figure 4:
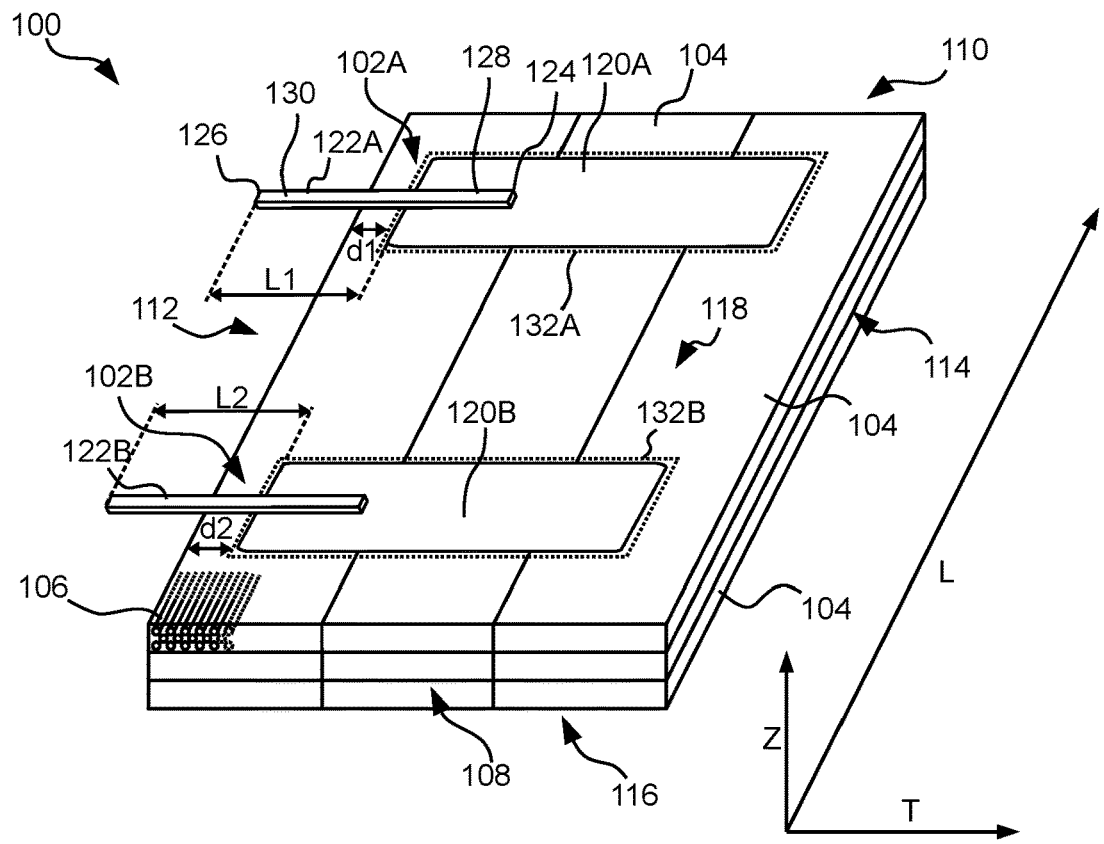

FIG. 4 schematically illustrates an exemplary main laminate 100, such as a main laminate 100 for a wind turbine blade 10 as described above. The main laminate 100 extends along a longitudinal direction L.

The main laminate 100 comprises a plurality of fibre elements 104. The fibre elements 104 may be pultruded fibre elements or fibre rowings or similar. In the present example, nine fibre elements 104, e.g. being pultruded fibre elements, are shown. Each of the fibre elements 104 comprises conductive fibres 106 arranged substantially along the longitudinal direction L (for simplicity, only some of the conductive fibres 106 of one of the fibre elements 104 are illustrated). The conductive fibres 106 may, for example, be carbon fibres. The plurality of fibre elements 104 collectively extends from a first end 108 to a second end 110 along the longitudinal direction L. Each of the fibre elements 104, in the present example, also extends along the longitudinal direction L. The plurality of fibre elements 104 collectively extends between a first edge 112 and a second edge 114 along a transversal direction T perpendicular to the longitudinal direction L. The plurality of fibre elements 104 collectively forms a top surface 118 between the first edge 112 and the second edge 114, and between the first end 108 and the second end 110. The plurality of fibre elements 104 collectively extends between a bottom surface 116 and the top surface 118 along a thickness direction Z perpendicular to the longitudinal direction L and the transversal direction T.

The main laminate 100 comprises a first connector element 102A comprising a first conductive mesh portion 120A and a first elongated connector part 122A. The main laminate 100 comprises an optional second connector element 102B comprising a second conductive mesh portion 120B and a second elongated connector part 122B. The main laminate 100 may comprise further not illustrated connector elements. The elongated connector parts 122A, 122B may be braid cables. Thus, the elongated connector parts 122A, 122B may be provided such as to allow bending of at least part thereof without compromising the electrical conductivity.

Each of the elongated connector parts 122A, 122B extends between a respective primary connector part end 124 and secondary connector part end 126. The primary connector part end 124 is coupled with the respective conductive mesh portion 120A, 120B. For example, the conductive mesh portion may be welded to the primary connector part end. Each of the elongated connector parts 122A, 122B extends at a connector part length L1, L2 from the respective conductive mesh portion 120A, 120B to the secondary connector part end 126. Each of the elongated connector parts 122A, 122B has a primary connector portion 128 towards the primary connector part end 124 and a secondary connector portion 130 between the primary connector portion 128 and the secondary connector part end 126.

The conductive mesh portions 120A, 120B are arranged at respective portions 132A, 132B of the top surface 118 at respective edge distances d1, d2 from the first edge 112. Specifically, the first conductive mesh portion 120A is arranged at a first portion 132A of the top surface 118 at a first edge distance d1 from the first edge 112. The second conductive mesh portion 120B is arranged at a second portion 132A of the top surface 118 at a second edge distance d2 from the first edge 112.

The elongated connector parts 122A, 122B extends from their primary connector part end 124 in the transversal direction towards the first edge 144. The connector part length L1, L2 is longer than the edge distance d1, d2 from the first edge 112. Specifically, the connector part length L1 of the first elongated connector part 122A is longer than the first edge distance d1. The connector part length L2 of the second elongated connector part 122B is longer than the second edge distance d2. The elongated connector parts 122A, 122B extends across the first edge 112.

Figure 5:
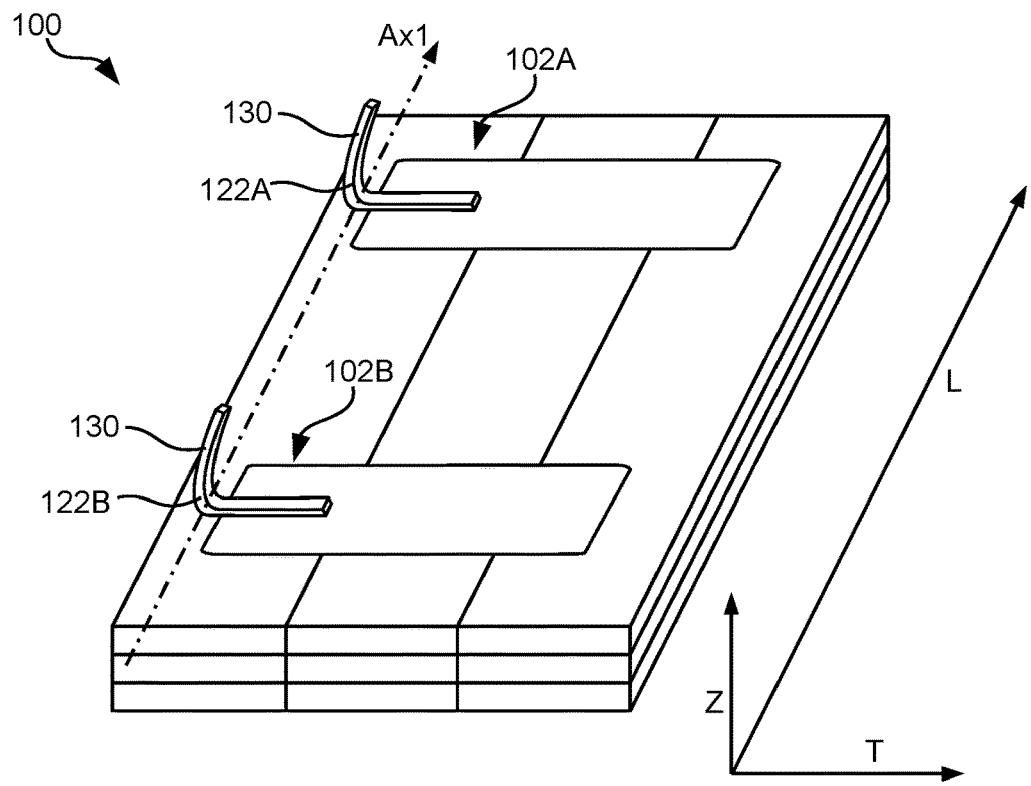

The secondary connector portion 130 of the elongated connector parts 122A, 122B are bendable around a bend axis Ax1 substantially parallel to the longitudinal direction L, as illustrated in FIG. 5, schematically illustrating the same main laminate 100 as illustrated in FIG. 4. Thereby, the main laminate 100 may be manufactured separate from the blade shell, and the main laminate may be repositioned to the blade shell without the connector elements 102A, 102B extending over the edge, which may complicate handling of the main laminate. After arranging the main laminate 100 in the blade shell, the elongated connector parts 122A, 122B may be straightened to their intended positions.

Figure 6:
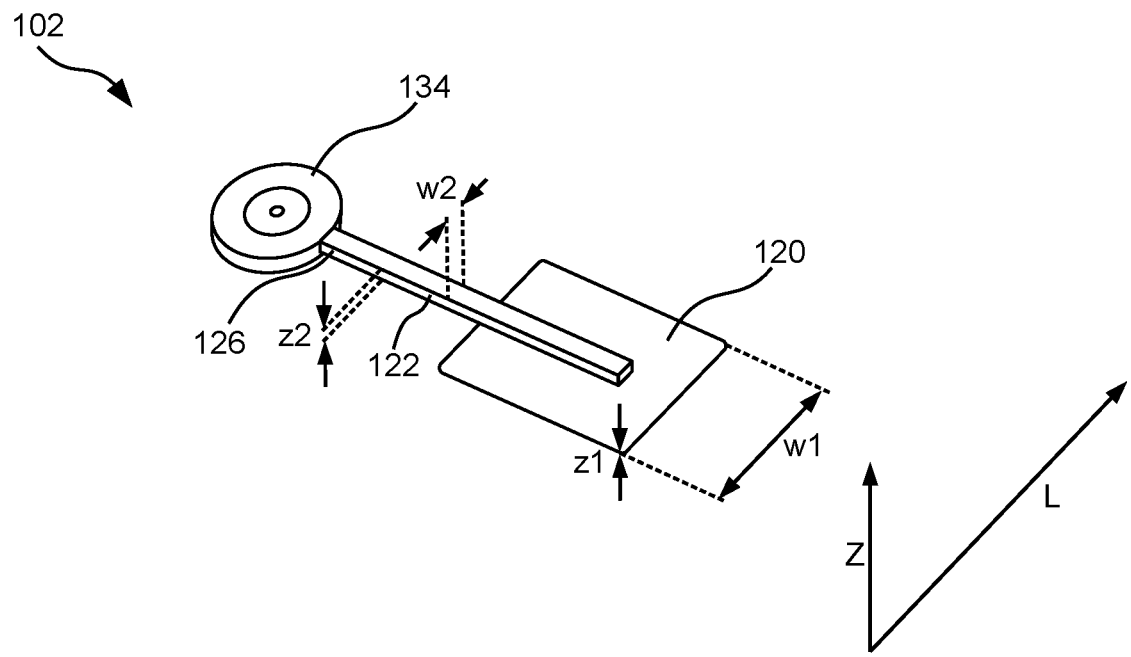

FIG. 6 schematically illustrates an exemplary connector element 102, such as the connector elements 102A, 102B as illustrated in FIGS. 4 and 5. The connector element 102 comprises a conductive mesh portion 120 and an elongated connector part 122, as described above.

The conductive mesh portion 120 has a mesh thickness z1 in the thickness direction Z. The elongated connector part 122 has a connector part thickness z2 in the thickness direction Z. The connector part thickness z2 is larger than the mesh thickness z1.

The conductive mesh portion 120 has a mesh width w1 in the longitudinal direction L. The elongated connector part 122 has a connector part width w2 in the longitudinal direction L. The connector part width w2 is smaller than the mesh width w1.

The connector element 102, as illustrated in the present figure, comprises an optional plate element 134. The plate element 134 is arranged at the secondary connector part end 126. For example, the plate element 134 may be welded to the secondary connector part end 126. The plate element 134 is adapted to be coupled with a lightning receptor of the wind turbine blade and/or to be connected to a down conductor of the wind turbine blade. Thus, the plate element 134 may provide for electrically connecting the connector element 102, and effectively also the main laminate on where it is arranged, to the lightning receptor and/or down conductor. The plate element 134 may be a disc as illustrated.

Figure 7:
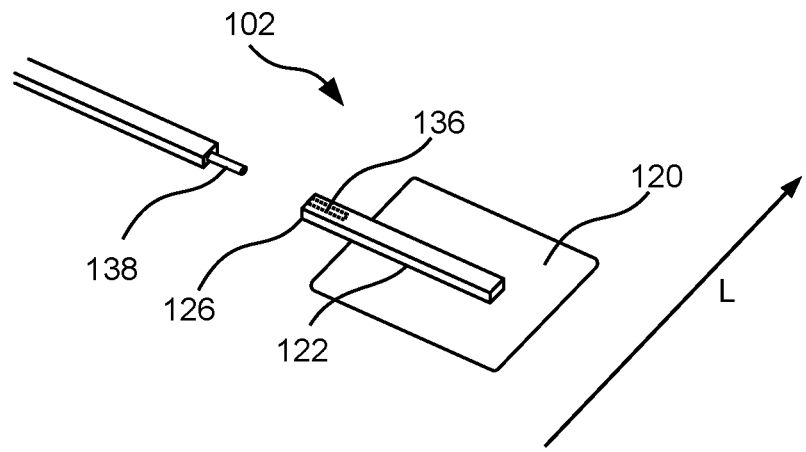

FIG. 7 schematically illustrates another exemplary connector element 102, such as the connector elements 102A, 102B as illustrated in FIGS. 4 and 5. Particularly, FIG. 7 illustrates that the connector element 102 may comprise a socket element 136. The socket element 136 is arranged at the secondary connector part end 126. The socket element 136 may be adapted to engage with a corresponding plug element 138. For example, the plug element 138 may be connected with a lightning receptor of the wind turbine blade and/or connected with a down conductor of the wind turbine blade. The plug 138 and socket 136 may be interchanged, i.e. the elongated connector part 122 may comprise the plug element 138, and the socket element may be connected with the lightning receptor and/or down conductor. The plug/socket 136,138 connection as illustrated may also be used to connect the plate element 134 as illustrated in FIG. 6 to the elongated connector part 122.

Figure 8:
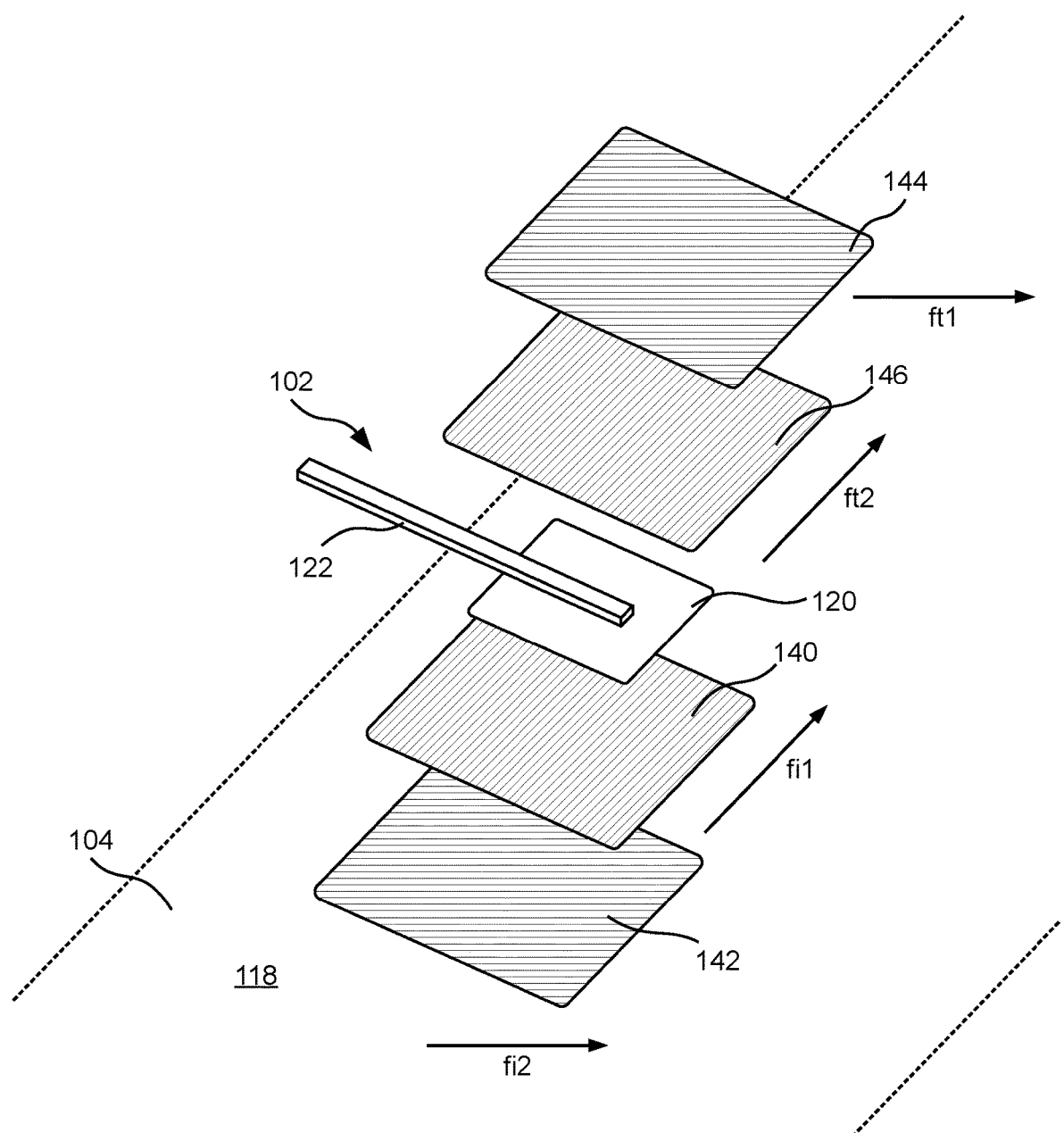

FIG. 8 schematically illustrates an exploded view of an exemplary arrangement including an exemplary connector element 102, such as the connector elements 102A, 102B as illustrated in FIGS. 4 and 5. Furthermore, although not illustrated, the connector element 102 may comprise any additional feature described in relation to FIGS. 6 and 7.

The arrangement of FIG. 8 may form part of the main laminate, i.e. the arrangement may be arranged at portions, e.g. 132A, 132B, of the top surface 118 of the plurality of fibre elements 104 as illustrated in FIGS. 4 and 5.

A primary intermediate fibre layer 140 is arranged between the conductive mesh portion 120 and the top surface 118 of the plurality of fibre elements 104. The primary intermediate fibre layer 140 may comprise conductive fibres, such as carbon fibres. A secondary intermediate fibre layer 142 is arranged between the primary intermediate fibre layer 140 and the top surface 118 of the plurality of fibre elements 104. The secondary intermediate fibre layer 142 may comprise conductive fibres, such as carbon fibres. The conductive fibres of the primary intermediate fibre layer 140 may be arranged along a primary intermediate fibre directions fi1. The conductive fibres of the secondary intermediate fibre layer 142 may be arranged along a secondary intermediate fibre direction fi2. The secondary intermediate fibre direction fi2 is different than the primary intermediate fibre direction fi1. In some example, the conductive fibres of the primary intermediate fibre layer 140 are arranged along a plurality of primary intermediate fibre directions, and/or the conductive fibres of the secondary intermediate fibre layer 142 are arranged along a plurality of secondary intermediate fibre direction. For example, the primary intermediate fibre layer 140 and/or the secondary intermediate fibre layer 142 may be biaxial fibre layers. In such example, at least one of the secondary intermediate fibre directions may be different than at least one of the primary intermediate fibre directions.

The conductive mesh portion 120 is arranged between a primary top fibre layer 144 and the top surface 118 of the plurality of fibre elements 104. The primary top fibre layer may comprise conductive fibres, such as carbon fibres. A secondary top fibre layer 146 is arranged between the primary top fibre layer 144 and the conductive mesh portion 120. The secondary top fibre layer 146 may comprise conductive fibres, such as carbon fibres. The conductive fibres of the primary top fibre layer 144 are arranged along a primary top fibre direction ft1. The conductive fibres of the secondary top fibre layer 146 are arranged along a secondary top fibre direction ft2. The secondary top fibre direction ft2 is different than the primary top fibre direction ft1. In some example, the conductive fibres of the primary top fibre layer 144 are arranged along a plurality of primary intermediate fibre directions, and/or the conductive fibres of the secondary top fibre layer 146 are arranged along a plurality of secondary intermediate fibre direction. For example, the primary top fibre layer 144 and/or the secondary top fibre layer 146 may be biaxial fibre layers. In such example, at least one of the secondary top fibre directions may be different than at least one of the primary top fibre directions.

Each of the primary intermediate fibre layer 140, the secondary intermediate fibre layer 142, the primary top fibre layer 144, and/or the secondary top fibre layer 146, may be a cloth, a veil, or a mat of fibre material.

Figure 9A:
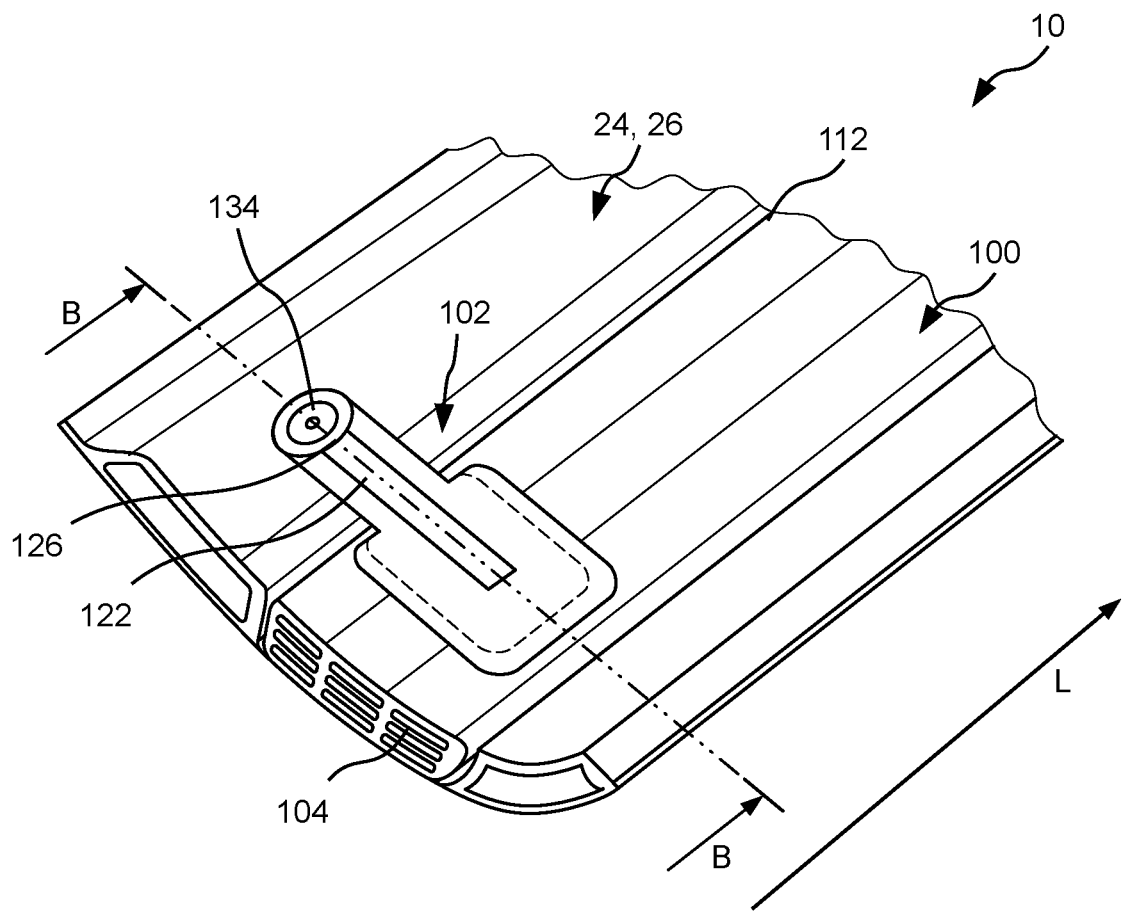
Figure 9B:
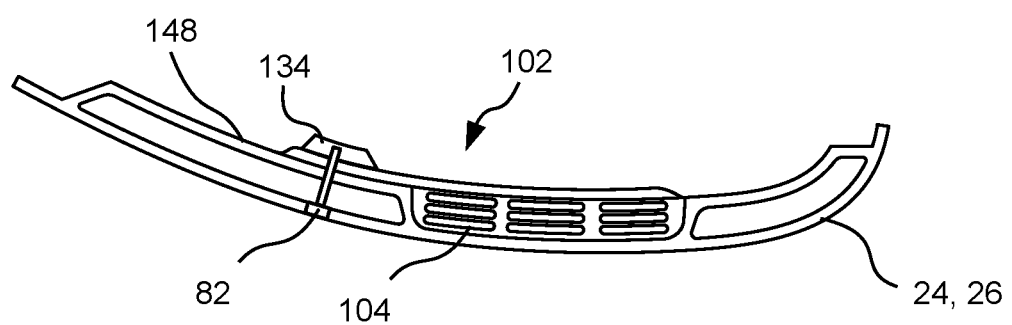

FIGS. 9A and 9B schematically illustrates part of a wind turbine blade 10, such as the wind turbine blade of FIGS. 1-3. FIG. 9B is a cross section along section B-B of FIG. 9A. The wind turbine blade 10 comprises a main laminate 100 with a connector element 102. The wind turbine blade extends in the longitudinal direction. The wind turbine blade comprises a lightning receptor 82 coupled with the secondary connector part end 126 of the elongated connector part 122. The elongated connector part 122 extends across the first edge 112 of the plurality of fibre elements 104. The secondary connector part end 126 is attached to an inside surface part 148 of the wind turbine blade 10, e.g. of the blade shell part 24, 26, lateral to the top surface 118 of the plurality of fibre elements 104 of the main laminate 100.

Figure 10:
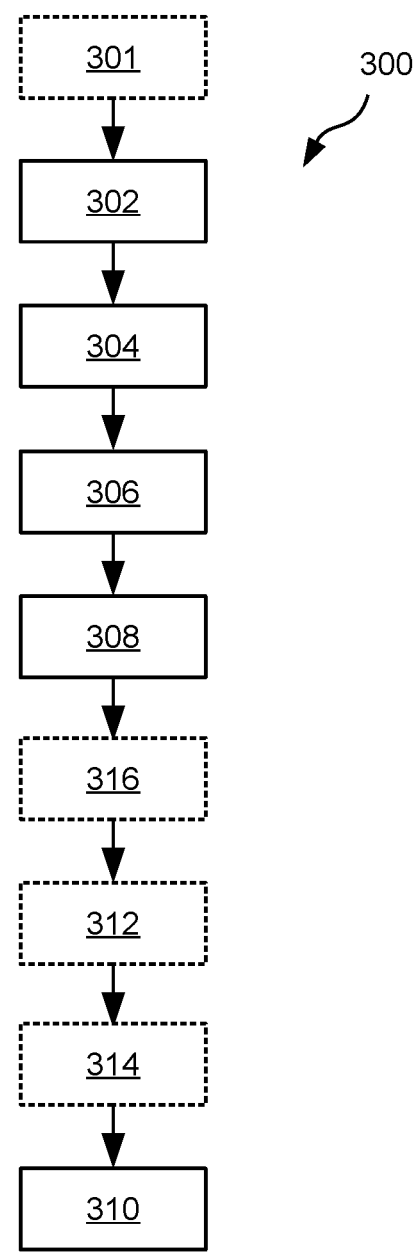
FIG. 10 is a block diagram of an exemplary method, FIGS. 11A-E schematically illustrates steps of the method.

FIG. 10 is a block diagram of an exemplary method 300 for manufacturing a main laminate for a wind turbine blade, such as the main laminate 100 as described in relation to the previous figures. FIGS. 11A-E illustrates parts of the procedure of the method 300. Thus, reference to FIGS. 11A-E is provided in the following where relevant.

Figure 11:
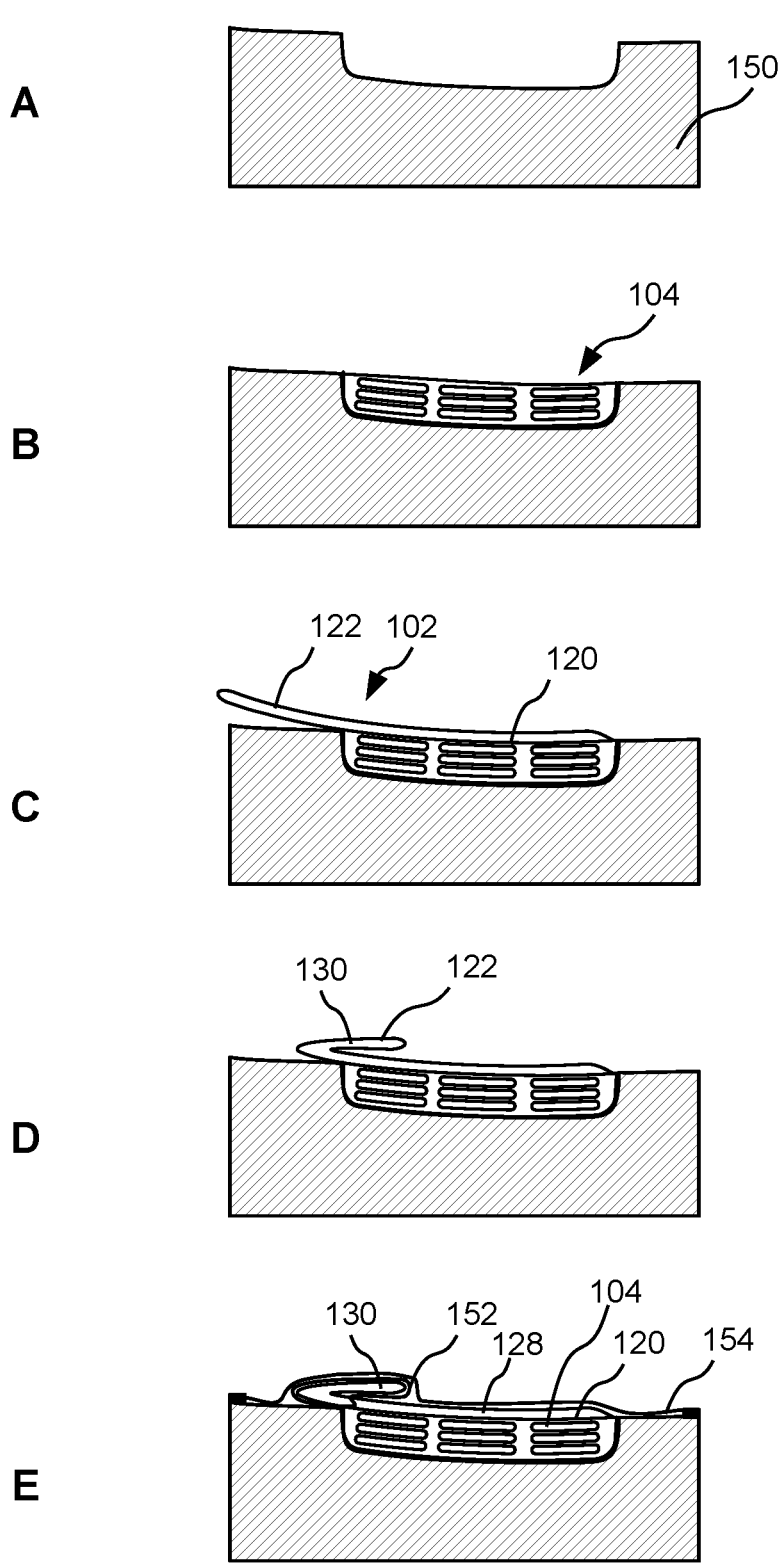

The method 300 may comprise providing 301 a main laminate mould 150 (see FIG. 11A).

The method 300 comprises providing 302 a plurality of fibre elements, such as the fibre elements 104 as described in relation to the previous figures. For example, wherein each of the plurality of fibre elements comprises conductive fibres.

The method 300 comprises arranging 304 the plurality of fibre elements such that the conductive fibres are arranged substantially along a longitudinal direction. Arranging 304 further includes arranging the plurality of fibre elements such that the plurality of fibre elements collectively extend from a first end to a second end along the longitudinal direction and between a first edge and a second edge along a transversal direction perpendicular to the longitudinal direction. Arranging 304 further includes arranging the plurality of fibre elements such that the plurality of fibre elements collectively forms a top surface between the first edge and the second edge. The plurality of fibre elements 104 may be arranged 304 in the main laminate mould 150 (see FIG. 11B).

The method 300 comprises providing 306 a connector element, such as the connector element 102, 102A, 102B as described in relation to the previous figures. For example, a connector element comprising a conductive mesh portion and an elongated connector part, wherein the elongated connector part extends between a primary connector part end and a secondary connector part end, and the primary connector part end being coupled with the conductive mesh portion.

The method 300 comprises arranging 308 the connector element 102 such that the conductive mesh portion 120 is at a portion of the top surface at an edge distance from the first edge (see FIG. 11C). Arranging 308 the connector element is also done such that the elongated connector part is extending from the primary connector part end in the transversal direction towards the first edge. A connector part length, from the conductive mesh portion to the secondary connector part end, is longer than the edge distance, e.g. such that the elongated connector part may extend across the first edge (see. FIGS. 4 and 5).

Arranging 308 the connector element may include providing and/or arranging the primary and/or secondary intermediate fibre layers between the conductive mesh portion of the connector element and the top surface of the plurality of fibre elements, as explained in relation to FIG. 8. Arranging 308 the connector element may include providing and/or arranging the primary and/or secondary top fibre layers such that the conductive mesh portion of the connector element is between the primary and/or secondary top fibre layers and the top surface of the plurality of fibre elements, as explained in relation to FIG. 8.

The elongated connector part has a primary connector portion towards the primary connector part end and a secondary connector portion between the primary connector portion and the secondary connector part end. The method 300 comprises infusing 310 the plurality of fibre elements, the conductive mesh portion and the primary connector portion of the elongated connector part with a first resin, without infusing the secondary connector portion with the first resin. The main laminate may be infused 310 by vacuum assisted resin transfer moulding (VARTM).

The method 300 may comprise, e.g. prior to infusing 310, enclosing 312 the plurality of fibre elements, the conductive mesh portion and the primary connector portion of the elongated connector part in a resin infusion enclosure 154 (see FIG. 11E). Enclosing 312 the plurality of fibre elements, the conductive mesh portion and the primary connector portion of the elongated connector part in a resin infusion enclosure may be such that the secondary connector portion of the elongated connector part is protruding outside the resin infusion enclosure, whereby infusion of the secondary connector portion may avoided and the flexibility of the secondary connector portion of the elongated connector part may be retained, which could alternatively be spoiled by resin infusion. Alternatively, or additionally, the method may comprise enclosing 314 the secondary connector portion 130 of the elongated connector part 102 in a protective enclosure 152 (See FIG. 11E). Thereby, infusion of the secondary connector portion may, also or alternatively, be avoided. Thereby, enclosing 312 the plurality of fibre elements, the conductive mesh portion and the primary connector portion of the elongated connector part in the resin infusion enclosure 154, may include also enclosing secondary connector portion 130, which itself is enclosed in the protective enclosure 152, in the resin infusion enclosure 154.

The method may comprise bending 316 the elongated connector part 122, e.g. the secondary connector portion 130 of the elongated connector part 122, around a bend axis substantially parallel to the longitudinal direction (see FIG. 11D). The elongated connector part may be bend 316 prior to infusing 310 the plurality of fibre elements, the conductive mesh portion and the primary connector portion of the elongated connector part. The elongated connector part may be bend 316 prior to enclosing 312 the plurality of fibre elements, the conductive mesh portion and the primary connector portion of the elongated connector part in the resin infusion enclosure and/or prior to enclosing 314 the secondary connector portion of the elongated connector part in the protective enclosure.

Figure 12:
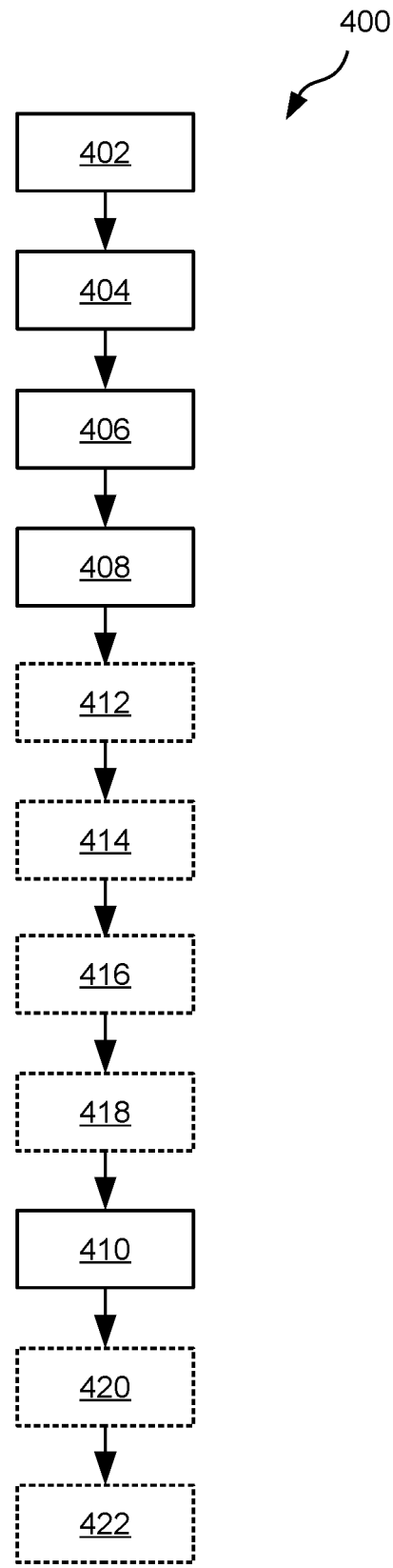
FIG. 12 is a block diagram of an exemplary method, FIGS. 13A-D schematically illustrates steps of the method.

FIG. 12 is a block diagram of an exemplary method 400 for manufacturing a wind turbine blade, such as the wind turbine blade 10 of any of the previous figures. FIGS. 13A-D illustrates parts of the procedure of the method 400. Thus, reference to FIGS. 13A-D is provided in the following where relevant.

Figure 13:
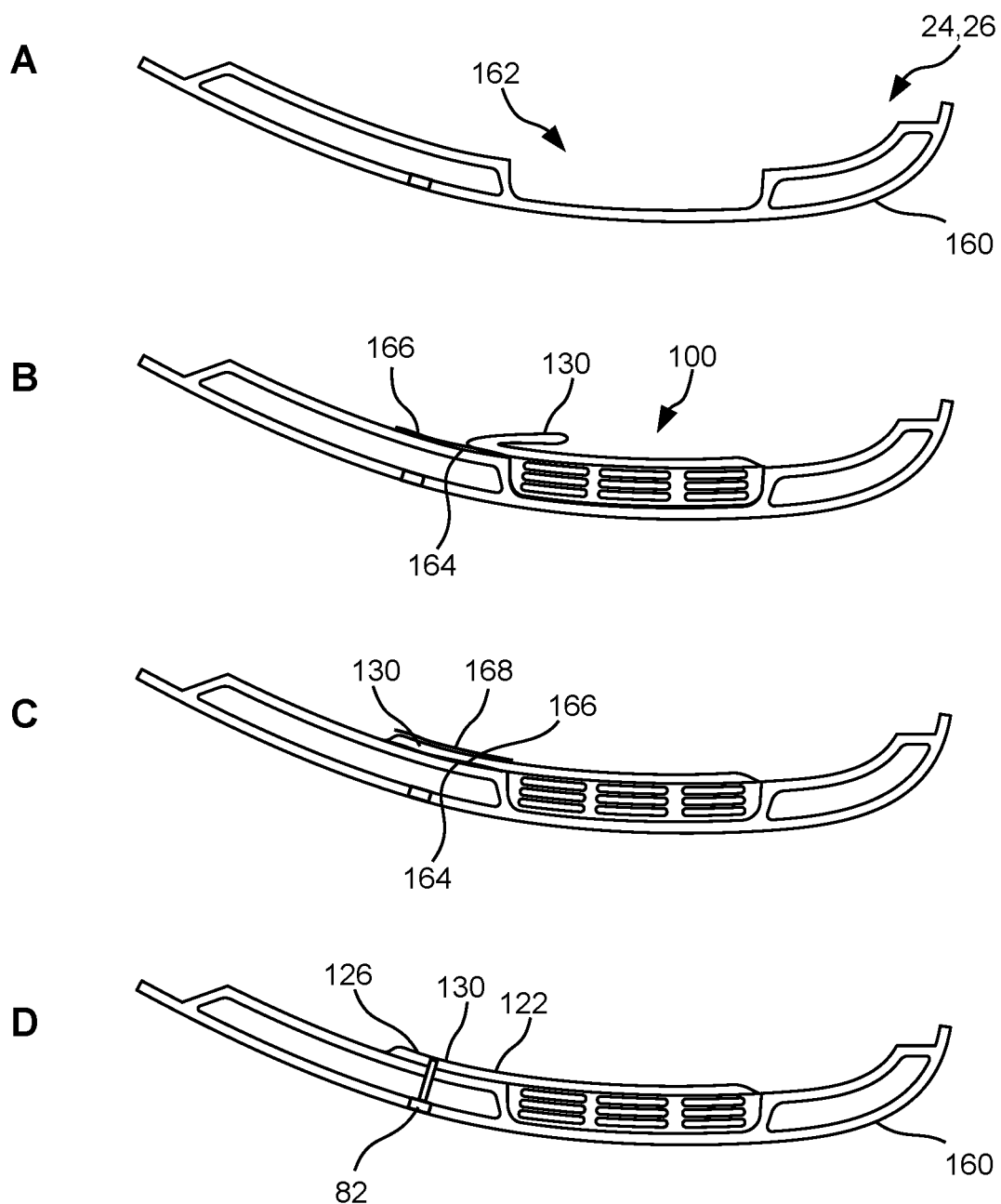

The method 400 comprises providing 402 a blade shell 24, 26 extending in a longitudinal direction from a root to a tip (see FIG. 13A). The blade shell has an outside surface 160 for forming an outer surface of the wind turbine blade and an inner side 162 opposite the outside surface. The blade shell may be provided in a blade shell mould by laying up fibre material and infusing the fibre material with a resin, e.g. by VARTM.

The method 400 comprises providing 404 a main laminate, such as the main laminate 100 of any of the previous figures. The main laminate may be provided 404 in accordance with the method 300 as described in relation to FIG. 10. Particularly, the main laminate may comprise a secondary connector portion of the elongated connector part which is bend around a bend axis substantially parallel to the longitudinal direction, such that the elongated connector part forms a bend of more than 45 degrees, such as more than 90 degrees and/or such that the elongated connector part does not cross the first edge of the main laminate. For example, such as exemplified in FIG. 11E.

The method 400 comprises positioning 406 the main laminate 100 on the inner side 162 of the blade shell 24, 26 (see FIG. 13B), such that the longitudinal direction of the blade shell is substantially parallel with the longitudinal direction of the main laminate. Furthermore, the main laminate is positioned such that the top surface of the plurality of fibre elements faces away from the inner side of the blade shell.

The method 400 comprises straightening 408 the elongated connector 122 to reduce the bend (see FIG. 13C). Straightening 408 may preferably be done after positioning 406 the main laminate on the inner side of the blade shell. Thereby, the elongated connector part extends across the first edge of the plurality of fibre elements of the main laminate and the secondary connector portion connects to an inside surface part of the inner side of the blade shell.

After straightening 408 the elongated connector to reduce the bend, the method may comprise infusing 410 the blade shell and the main laminate with a second resin. The second resin may be the same type of resin as the first resin used to infuse the main laminate. Alternatively the first resin and the second resin may be different resins.

The method 400 may comprise, e.g. prior to infusing 410 the blade shell and the main laminate, providing 412 a tertiary intermediate fibre layer 166, and arranging 414 the tertiary intermediate fibre layer 166 such that the tertiary intermediate fibre layer 166 is between the secondary connector portion 130 and the inside surface part 164 of the inner side 162 of the blade shell 24, 26 (see FIGS. 13B and 13C). The tertiary intermediate fibre layer 166 may comprise conductive fibres, such as carbon fibres.

The method 400 may comprise, e.g. prior to infusing 410 the blade shell and the main laminate, providing 416 a tertiary top fibre layer 168, and arranging 418 the tertiary top fibre layer 168 such that the secondary connector portion 130 is between the tertiary top fibre layer 168 and the inside surface part 164 of the inner side 162 of the blade shell 24, 26 (see FIG. 13C). The tertiary top fibre layer 168 may comprise conductive fibres, such as carbon fibres.

Each of the tertiary intermediate fibre layer 166, and/or the tertiary top fibre layer 168, may be a cloth, a veil, or a mat of fibre material.

The method 400 may comprise electrically connecting 420 the connector element to a down conductor of the wind turbine blade. Alternatively or additionally, e.g. concurrently, the method 400 may comprising coupling 422 a lightning receptor 82 provided on the outside surface 160 of the blade shell with the secondary connector part end 126 and/or the secondary connector portion 130 of the elongated connector 122, e.g. through the blade shell, such as by an electrically conductive screw or bolt (see FIG. 13D).

Exemplary embodiments of the present disclosure are set out in the following items:

1. A main laminate for a wind turbine blade, the main laminate extending along a longitudinal direction and comprising:
   a plurality of fibre elements, wherein each of the plurality of fibre elements comprises conductive fibres arranged substantially along the longitudinal direction, the plurality of fibre elements collectively extends from a first end to a second end along the longitudinal direction and between a first edge and a second edge along a transversal direction perpendicular to the longitudinal direction, the plurality of fibre elements collectively forms a top surface between the first edge and the second edge, a thickness direction is perpendicular to the transversal direction and the longitudinal direction,
   a connector element comprising a conductive mesh portion and an elongated connector part, the elongated connector part extends between a primary connector part end and a secondary connector part end, the primary connector part end being coupled with the conductive mesh portion, the elongated connector part extending at a connector part length from the conductive mesh portion to the secondary connector part end, the elongated connector part having a primary connector portion towards the primary connector part end and a secondary connector portion between the primary connector portion and the secondary connector part end, the conductive mesh portion being arranged at a portion of the top surface at an edge distance from the first edge, and the elongated connector part extending from the primary connector part end in the transversal direction towards the first edge, wherein the connector part length is longer than the edge distance, and the secondary connector portion of the elongated connector part being bendable around a bend axis substantially parallel to the longitudinal direction.
2. Main laminate according to item 1, wherein the elongated connector part is a braid cable.
3. Main laminate according to any of the preceding items, wherein the conductive mesh portion is welded to the primary connector part end.
4. Main laminate according to any of the preceding items, wherein the conductive mesh portion has a mesh thickness in the thickness direction and the elongated connector part has a connector part thickness in the thickness direction, wherein the connector part thickness is larger than the mesh thickness.
5. Main laminate according to any of the preceding items, wherein the conductive mesh portion has a mesh width in the longitudinal direction and the elongated connector part has a connector part width in the longitudinal direction, wherein the connector part width is smaller than the mesh width.
6. Main laminate according to any of the preceding items, wherein the connector element comprises a plate element, the plate element being arranged at the secondary connector part end, the plate element being adapted to be coupled with a lightning receptor of the wind turbine blade and/or to be connected to a down conductor of the wind turbine blade.
7. Main laminate according to item 6, wherein the plate element is welded to the secondary connector part end.
8. Main laminate according to any of items 1-5, wherein the connector element comprises a plug or socket element, the plug or socket element being arranged at the secondary connector part end, the plug or socket element being adapted to engage with a corresponding plug or socket element connected with a lightning receptor of the wind turbine blade and/or connected with a down conductor of the wind turbine blade.
9. Main laminate according to any of the preceding items, wherein the plurality of fibre elements are pultruded fibre elements extending along the longitudinal direction.
10. Main laminate according to any of the preceding items, wherein the conductive fibres of the plurality of fibre elements are carbon fibres.
11. Main laminate according to any of the preceding items comprising a primary intermediate fibre layer comprising conductive fibres, such as carbon fibres, wherein the primary intermediate fibre layer is arranged between the conductive mesh portion and the top surface of the plurality of fibre elements.
12. Main laminate according to item 11, comprising a secondary intermediate fibre layer comprising conductive fibres, such as carbon fibres, wherein the secondary intermediate fibre layer is arranged between the primary intermediate fibre layer and the top surface of the plurality of fibre elements, and wherein the conductive fibres of the primary intermediate fibre layer are arranged along one or more primary intermediate fibre directions and the conductive fibres of the secondary intermediate fibre layer are arranged along one or more secondary intermediate fibre directions, and wherein at least one of the one or more secondary intermediate fibre directions are different than the one or more primary intermediate fibre directions.
13. Main laminate according to any of items 11-12, wherein the primary intermediate fibre layer and/or the secondary intermediate fibre layer are biaxial fibre layers.
14. Main laminate according to any of the preceding items comprising a primary top fibre layer comprising conductive fibres, such as carbon fibres, wherein the conductive mesh portion is arranged between the primary top fibre layer and the top surface of the plurality of fibre elements.
15. Main laminate according to item 14, comprising a secondary top fibre layer comprising conductive fibres, such as carbon fibres, wherein the secondary top fibre layer is arranged between the primary top fibre layer and the conductive mesh portion, and wherein the conductive fibres of the primary top fibre layer are arranged along one or more primary top fibre directions and the conductive fibres of the secondary top fibre layer are arranged along one or more secondary top fibre directions, and wherein at least one of the one or more secondary top fibre directions are different than the one or more primary top fibre directions.
16. Main laminate according to any of items 14-15, wherein the primary top fibre layer and/or the secondary top fibre layer are biaxial fibre layers.
17. A wind turbine blade comprising a main laminate according to any of the preceding items, the wind turbine blade extending in the longitudinal direction from a root to a tip and comprising a pressure side, a suction side, the wind turbine blade further comprising a down conductor extending in the longitudinal direction and being configured to provide an electrical coupling to the ground, and wherein the connector element is electrically connected to the down conductor.
18. The wind turbine blade according to item 17 comprising a lightning receptor, and wherein the lightning receptor is coupled with the secondary connector part end of the elongated connector part.
19. The wind turbine blade according to any of items 17-18, wherein the elongated connector part extends across the first edge, and the secondary connector part end is attached to an inside surface part of the wind turbine blade lateral to the top surface of the plurality of fibre elements of the main laminate.
20. A method for manufacturing a main laminate for a wind turbine blade, the method comprising:
providing a plurality of fibre elements, wherein each of the plurality of fibre elements comprises conductive fibres,
arranging the plurality of fibre elements such that the conductive fibres are arranged substantially along a longitudinal direction, and such that the plurality of fibre elements collectively extend from a first end to a second end along the longitudinal direction and between a first edge and a second edge along a transversal direction perpendicular to the longitudinal direction, the plurality of fibre elements collectively forms a top surface between the first edge and the second edge, a thickness direction is perpendicular to the transversal direction and the longitudinal direction,
providing a connector element comprising a conductive mesh portion and a elongated connector part, the elongated connector part extends between a primary connector part end and a secondary connector part end, the primary connector part end being coupled with the conductive mesh portion, the elongated connector part extending at a connector part length from the conductive mesh portion to the secondary connector part end, the elongated connector part having a primary connector portion towards the primary connector part end and a secondary connector portion between the primary connector portion and the secondary connector part end,
arranging the connector element such that the conductive mesh portion is at a portion of the top surface at an edge distance from the first edge, and such that the elongated connector part is extending from the primary connector part end in the transversal direction towards the first edge, wherein the connector part length is longer than the edge distance,
infusing the plurality of fibre elements, the conductive mesh portion and the primary connector portion of the elongated connector part with a first resin, without infusing the secondary connector portion with the first resin.
21. Method according to item 20 comprising enclosing the plurality of fibre elements, the conductive mesh portion and the primary connector portion of the elongated connector part in a resin infusion enclosure, and such that the secondary connector portion of the elongated connector part is protruding outside the resin infusion enclosure.
22. Method according to any of items 20-21 comprising enclosing the secondary connector portion of the elongated connector part in a protective enclosure.
23. Method according to any of items 20-22 comprising bending the elongated connector part around a bend axis substantially parallel to the longitudinal direction.
24. A method for manufacturing a wind turbine blade comprising:
providing a blade shell extending in a longitudinal direction from a root to a tip, the blade shell having an outside surface for forming an outer surface of the wind turbine blade and an inner side opposite the outside surface,
providing a main laminate according to any of items 1-16, wherein the secondary connector portion of the elongated connector part is bend around a bend axis substantially parallel to the longitudinal direction, such that the elongated connector part forms a bend of more than 45 degrees, such as more than 90 degrees,
positioning the main laminate on the inner side of the blade shell, such that the longitudinal direction of the blade shell is substantially parallel with the longitudinal direction of the main laminate, and such that the top surface of the plurality of fibre elements faces away from the inner side of the blade shell,
straightening the elongated connector to reduce the bend, such that the elongated connector part extends across the first edge of the plurality of fibre elements of the main laminate and the secondary connector portion connects to an inside surface part of the inner side of the blade shell.
25. Method according to item 24 comprising electrically connecting the connector element to a down conductor of the wind turbine blade.
26. Method according to any of items 24-25 comprising coupling a lightning receptor provided on the outside surface of the blade shell with the secondary connector part end of the elongated connector, through the blade shell, e.g. by an electrically conductive screw or bolt.
27. Method according to any of items 24-26 comprising, after straightening the elongated connector to reduce the bend, infusing the blade shell and the main laminate with a second resin.
28. Method according to any of items 24-27 comprising providing a tertiary intermediate fibre layer comprising conductive fibres, such as carbon fibres, and arranging the tertiary intermediate fibre layer such that the tertiary intermediate fibre layer is between the secondary connector portion and the inside surface part of the inner side of the blade shell.

29. Method according to any of items 24-28 comprising providing a tertiary top fibre layer comprising conductive fibres, such as carbon fibres, and arranging the tertiary top fibre layer such that the secondary connector portion is between the tertiary top fibre layer and the inside surface part of the inner side of the blade shell.

The disclosure has been described with reference to a preferred embodiment. However, the scope of the invention is not limited to the illustrated embodiment, and alterations and modifications can be carried out without deviating from the scope of the invention.

Throughout the description, the use of the terms "first", "second", "third", "fourth", "primary", "secondary", "tertiary" etc. does not imply any particular order or importance, but are included to identify individual elements. Furthermore, the labelling of a first element does not imply the presence of a second element and vice versa.

LIST OF REFERENCES 2 wind turbine
4 tower
6 nacelle
8 hub
10 blade
14 blade tip
15 tip end
16 blade root
17 root end
18 leading edge
20 trailing edge
24 first blade shell part (pressure side)
26 second blade shell part (suction side)
28 bond lines/glue joints
30 root region
32 transition region
34 airfoil region
38 chord line
39 blade median
40 shoulder
42 leading edge shear web
44 trailing edge shear web
80 down conductor
82 lightning receptor
84 common connector
100 main laminate
102, 102A, 102B connector element
104 fibre element
106 fibres
108 first end
110 second end
112 first edge
114 second edge
116 bottom surface
118 top surface
120, 120A, 120B conductive mesh portion
122, 122A, 122B elongated connector part
124 primary connector part end
126 secondary connector part end
128 primary connector portion
130 secondary connector portion
132, 132A, 132B portion of top surface
134 plate element
136 socket element
138 plug element
140 primary intermediate fibre layer
142 secondary intermediate fibre layer
144 primary top fibre layer
146 secondary top fibre layer
148 insider surface part
150 main laminate mould
152 protective enclosure
154 resin infusion enclosure
160 outside surface
162 inner side
164 inside surface part
166 tertiary intermediate fibre layer
168 tertiary top fibre layer
300 method for manufacturing main laminate
301 providing mould
302 providing fibre elements
304 arranging fibre elements
306 providing connector element
308 arranging connector element
310 infusing
312 enclosing in resin infusion enclosure
314 enclosing in protective enclosure
316 bending elongated connector part
400 method for manufacturing wind turbine blade
402 providing blade shell
404 providing main laminate
406 positioning main laminate
408 straightening elongated connector
410 infusing
412 providing intermediate fibre layer
414 arranging intermediate fibre layer
416 providing top fibre layer
418 arranging top fibre layer
420 electrically connecting connector element to down conductor
422 electrically coupling lightning receptor and connector element
L longitudinal direction
T transversal direction
Z thickness direction
d1 first edge distance
d2 second edge distance
L1, L2 connector part length
fi1 primary intermediate fibre direction
fi2 secondary intermediate fibre direction
ft1 primary top fibre direction
ft2 secondary top fibre direction
z1 mesh thickness
z2 connector part thickness
w1 mesh width
w2 connector part width

The invention claimed is:

1. A method for manufacturing for a wind turbine blade, the method comprising:
providing a blade shell extending in a longitudinal direction from a root to a tip, the blade shell having an outside surface for forming an outer surface of the wind turbine blade and an inner side opposite the outside surface;
providing a main laminate, the main laminate extending along a longitudinal direction and comprising:
a plurality of fibre elements, wherein each of the plurality of fibre elements comprises conductive fibres arranged along the longitudinal direction, the plurality of fibre elements collectively extends from a first end to a second end along the longitudinal direction and between a first edge and a second edge along a transversal direction perpendicular to the longitudinal direction, the plurality of fibre elements collectively forms a top surface between the first edge and the second edge, a thickness direction is perpendicular to the transversal direction and the longitudinal direction; and a connector element comprising a conductive mesh portion and an elongated connector part, the elongated connector part extends between a primary connector part end and a secondary connector part end, the primary connector part end being coupled with the conductive mesh portion, the elongated connector part extending at a connector part length from the conductive mesh portion to the secondary connector part end, the elongated connector part having a primary connector portion towards the primary connector part end and a secondary connector portion between the primary connector portion and the secondary connector part end, the conductive mesh portion being arranged at a portion of the top surface at an edge distance from the first edge, and the elongated connector part extending from the primary connector part end in the transversal direction towards the first edge, wherein the connector part length is longer than the edge distance, and the secondary connector portion of the elongated connector part being bendable around a bend axis parallel to the longitudinal direction, wherein the secondary connector portion of the elongated connector part is bent around the bend axis, such that the elongated connector part forms a bend of more than 45° degrees;

positioning the main laminate on the inner side of the blade shell, such that a longitudinal axis of the blade shell is parallel with the longitudinal direction, and such that the top surface of the plurality of fibre elements faces away from the inner side of the blade shell; and straightening the elongated connector part to reduce the bend, such that the elongated connector part extends across the first edge of the plurality of fibre elements of the main laminate and the secondary connector portion connects to an inside surface part of the inner side of the blade shell.

2. The method according to claim 1, wherein the elongated connector part is a braid cable.

3. The method according to claim 1, wherein the conductive mesh portion has a mesh thickness in the thickness direction and the elongated connector part has a connector part thickness in the thickness direction, wherein the connector part thickness is larger than the mesh thickness.

4. The method according to claim 1, wherein the conductive mesh portion has a mesh width in the longitudinal direction and the elongated connector part has a connector part width in the longitudinal direction, wherein the connector part width is smaller than the mesh width.

5. The method according to claim 1, wherein the connector element comprises a plate element, the plate element being arranged at the secondary connector part end, the plate element being adapted to be coupled with a lightning receptor of the wind turbine blade and/or to be connected to a down conductor of the wind turbine blade.

6. The method according to claim 5, wherein the plate element is welded to the secondary connector part end.

7. The method according to claim 1, wherein the connector element comprises a plug or socket element, the plug or socket element being arranged at the secondary connector part end, the plug or socket element being adapted to engage with a corresponding plug or socket element connected with a lightning receptor of the wind turbine blade and/or connected with a down conductor of the wind turbine blade.

8. The method according to claim 1, wherein the plurality of fibre elements are pultruded fibre elements extending along the longitudinal direction.

9. The method according to claim 1, wherein the conductive fibres of the plurality of fibre elements are carbon fibres.

10. The method according to claim 1, wherein the main laminate comprises a primary intermediate fibre layer comprising conductive fibres, wherein the primary intermediate fibre layer is arranged between the conductive mesh portion and the top surface of the plurality of fibre elements.

11. The method according to claim 10, wherein the main laminate comprises a secondary intermediate fibre layer comprising conductive fibres, wherein the secondary intermediate fibre layer is arranged between the primary intermediate fibre layer and the top surface of the plurality of fibre elements, and wherein the conductive fibres of the primary intermediate fibre layer are arranged along one or more primary intermediate fibre directions and the conductive fibres of the secondary intermediate fibre layer are arranged along one or more secondary intermediate fibre directions, and wherein at least one of the one or more secondary intermediate fibre directions are different than the one or more primary intermediate fibre directions.

12. The method according to claim 1, wherein the main laminate comprises a primary top fibre layer comprising conductive fibres, wherein the conductive mesh portion is arranged between the primary top fibre layer and the top surface of the plurality of fibre elements.

13. The method according to claim 12, wherein the main laminate comprises a secondary top fibre layer comprising conductive fibres, wherein the secondary top fibre layer is arranged between the primary top fibre layer and the conductive mesh portion, and wherein the conductive fibres of the primary top fibre layer are arranged along one or more primary top fibre directions and the conductive fibres of the secondary top fibre layer are arranged along one or more secondary top fibre directions, and wherein at least one of the one or more secondary top fibre directions are different than the one or more primary top fibre directions.

14. The method according to claim 1, wherein the elongated connector part forms a bend of more than 90° degrees.

15. A method for manufacturing a main laminate for a wind turbine blade, the method comprising:

providing a plurality of fibre elements, wherein each of the plurality of fibre elements comprises conductive fibres;

arranging the plurality of fibre elements such that the conductive fibres are arranged along a longitudinal direction, and such that the plurality of fibre elements collectively extend from a first end to a second end along the longitudinal direction and between a first edge and a second edge along a transversal direction perpendicular to the longitudinal direction, the plurality of fibre elements collectively forms a top surface between the first edge and the second edge, a thickness direction is perpendicular to the transversal direction and the longitudinal direction;

providing a connector element comprising a conductive mesh portion and a elongated connector part, the elongated connector part extends between a primary connector part end and a secondary connector part end, the primary connector part end being coupled with the conductive mesh portion, the elongated connector part extending at a connector part length from the conductive mesh portion to the secondary connector part end, the elongated connector part having a primary connector portion towards the primary connector part end and a secondary connector portion between the primary connector portion and the secondary connector part end;

arranging the connector element such that the conductive mesh portion is at a portion of the top surface at an edge distance from the first edge, and such that the elongated connector part is extending from the primary connector part end in the transversal direction towards the first edge, wherein the connector part length is longer than the edge distance;

infusing the plurality of fibre elements, the conductive mesh portion and the primary connector portion of the elongated connector part with a first resin, without infusing the secondary connector portion with the first resin.

16. The method according to claim 15, comprising enclosing the plurality of fibre elements, the conductive mesh portion and the primary connector portion of the elongated connector part in a resin infusion enclosure, and such that the secondary connector portion of the elongated connector part is protruding outside the resin infusion enclosure, and/or the method comprising enclosing the secondary connector portion of the elongated connector part in a protective enclosure.

17. The method according to claim 15, comprising bending the elongated connector part around a bend axis parallel to the longitudinal direction.

18. A main laminate for a wind turbine blade, the main laminate extending along a longitudinal direction and comprising:
  a plurality of fibre elements, wherein each of the plurality of fibre elements comprises conductive fibres arranged along the longitudinal direction, the plurality of fibre elements collectively extends from a first end to a second end along the longitudinal direction and between a first edge and a second edge along a transversal direction perpendicular to the longitudinal direction, the plurality of fibre elements collectively forms a top surface between the first edge and the second edge, a thickness direction is perpendicular to the transversal direction and the longitudinal direction;
  a connector element comprising a conductive mesh portion and an elongated connector part, the elongated connector part extends between a primary connector part end and a secondary connector part end, the primary connector part end being coupled with the conductive mesh portion, the elongated connector part extending at a connector part length from the conductive mesh portion to the secondary connector part end, the elongated connector part having a primary connector portion towards the primary connector part end and a secondary connector portion between the primary connector portion and the secondary connector part end, the conductive mesh portion being arranged at a portion of the top surface at an edge distance from the first edge, and the elongated connector part extending from the primary connector part end in the transversal direction towards the first edge, wherein the connector part length is longer than the edge distance, and the secondary connector portion of the elongated connector part being bendable around a bend axis parallel to the longitudinal direction;
  a primary intermediate fibre layer comprising conductive fibres, wherein the primary intermediate fibre layer is arranged between the conductive mesh portion and the top surface of the plurality of fibre elements; and
  a secondary intermediate fibre layer comprising conductive fibres, wherein the secondary intermediate fibre layer is arranged between the primary intermediate fibre layer and the top surface of the plurality of fibre elements, and wherein the conductive fibres of the primary intermediate fibre layer are arranged along one or more primary intermediate fibre directions and the conductive fibres of the secondary intermediate fibre layer are arranged along one or more secondary intermediate fibre directions, and wherein at least one of the one or more secondary intermediate fibre directions are different than the one or more primary intermediate fibre directions.

19. A main laminate for a wind turbine blade, the main laminate extending along a longitudinal direction and comprising:
  a plurality of fibre elements, wherein each of the plurality of fibre elements comprises conductive fibres arranged along the longitudinal direction, the plurality of fibre elements collectively extends from a first end to a second end along the longitudinal direction and between a first edge and a second edge along a transversal direction perpendicular to the longitudinal direction, the plurality of fibre elements collectively forms a top surface between the first edge and the second edge, a thickness direction is perpendicular to the transversal direction and the longitudinal direction;
  a connector element comprising a conductive mesh portion and an elongated connector part, the elongated connector part extends between a primary connector part end and a secondary connector part end, the primary connector part end being coupled with the conductive mesh portion, the elongated connector part extending at a connector part length from the conductive mesh portion to the secondary connector part end, the elongated connector part having a primary connector portion towards the primary connector part end and a secondary connector portion between the primary connector portion and the secondary connector part end, the conductive mesh portion being arranged at a portion of the top surface at an edge distance from the first edge, and the elongated connector part extending from the primary connector part end in the transversal direction towards the first edge, wherein the connector part length is longer than the edge distance, and the secondary connector portion of the elongated connector part being bendable around a bend axis parallel to the longitudinal direction;
  a primary top fibre layer comprising conductive fibres, wherein the conductive mesh portion is arranged between the primary top fibre layer and the top surface of the plurality of fibre elements, and
  a secondary top fibre layer comprising conductive fibres, wherein the secondary top fibre layer is arranged between the primary top fibre layer and the conductive mesh portion, and wherein the conductive fibres of the primary top fibre layer are arranged along one or more primary top fibre directions and the conductive fibres of the secondary top fibre layer are arranged along one or more secondary top fibre directions, and wherein at least one of the one or more secondary top fibre directions are different than the one or more primary top fibre directions.

* * * * *